US008351075B2

(12) United States Patent
Roulland et al.

(10) Patent No.: US 8,351,075 B2
(45) Date of Patent: Jan. 8, 2013

(54) PRINT MEDIATOR (75) Inventors: Frederic Roulland, Le Versoud (FR); Jutta K. Willamowski, Grenoble (FR); Tommaso Colombino, Grenoble (FR); David Martin, Grenoble (FR); Jacki O'Neill, Grenoble (FR); Karen M. Braun, Fairport, NY (US); Robert J. Rolleston, Rochester, NY (US); Mary Ann Sprague, Macedon, NY (US); Geoffrey Woolfe, Canandaigua, NY (US)

(73) Assignee: Xerox Corporation, Norwalk, CT (US)

(*) Notice: Subject to any disclaimer, the term of this patent is extended or adjusted under 35 U.S.C. 154(b) by 1096 days.

(21) Appl. No.: 12/138,846

(22) Filed: Jun. 13, 2008

(65) Prior Publication Data

US 2009/0310152 A1 Dec. 17, 2009

(51) Int. Cl.
*H04N 1/60* (2006.01)
(52) U.S. Cl. .......................... 358/1.9; 358/1.15; 358/518
(58) Field of Classification Search ................ 358/1.9, 358/1.15, 1.18
See application file for complete search history.

(56) References Cited

U.S. PATENT DOCUMENTS

| | | | |
|---|---|---|---|
| 6,344,902 B1* | 2/2002 | Duke et al. ............... 358/1.9 |
| 6,757,071 B1 | 6/2004 | Goodman et al. | |
| 6,803,921 B1 | 10/2004 | Balasubramanian et al. | |
| 2002/0116399 A1* | 8/2002 | Camps et al. ............ 707/200 |
| 2003/0053097 A1* | 3/2003 | Ohga et al. ................ 358/1.9 |
| 2006/0221381 A1* | 10/2006 | Morales ..................... 358/1.15 |
| 2007/0008557 A1 | 1/2007 | Rumph et al. | |
| 2007/0008558 A1* | 1/2007 | Rumph et al. ............. 358/1.9 |
| 2007/0008559 A1 | 1/2007 | Rich et al. | |
| 2007/0008560 A1 | 1/2007 | Eschbach | |
| 2007/0109569 A1 | 5/2007 | Eschbach et al. | |
| 2007/0268513 A1 | 11/2007 | Enloe | |
| 2008/0068626 A1 | 3/2008 | Bala et al. | |
| 2008/0079964 A1 | 4/2008 | Woolfe et al. | |
| 2008/0137914 A1 | 6/2008 | Minhao | |
| 2008/0143738 A1 | 6/2008 | Wolfe et al. | |
| 2008/0204829 A1 | 8/2008 | Harrington | |
| 2008/0278744 A1 | 11/2008 | Marchesotti | |
| 2010/0313123 A1* | 12/2010 | Tomomatsu .............. 715/274 |

OTHER PUBLICATIONS

U.S. Appl. No. 11/282,850, filed Nov. 17, 2005, Eschbach, et al.
U.S. Appl. No. 11/522,739, filed Sep. 18, 2006, Balasubramanian, et al.
M.A.Sprague, et al., *Ethnographic Studies of Prepress Workflow*, ISCC Annual Meeting, Kansas City, MO, Apr. 29-30, 2007.
M.Riordan, *Variation in Premedia Color and the Potential Automation of Imaging Tasks*, PICRM-2005-05 Printing Industry Center at RIT, 2006.

(Continued)

*Primary Examiner* — King Poon
*Assistant Examiner* — Iriana Cruz
(74) *Attorney, Agent, or Firm* — Fay Sharpe LLP (57) ABSTRACT

A print mediator includes an interface module which serves as an interface for a document to be submitted for printing. The interface module communicates with an associated printing infrastructure for acquiring color rendering information for a print queue of the printing infrastructure. A reviewing application receives the acquired color rendering information and generates a visual representation of a document to be submitted for printing based thereon. Problems relating to color rendering by the printing infrastructure are detected and proposals for correction are presented to the submitter by the reviewing application. The user can review the proposals and accept or reject them as well as making annotations on the document. An analogous reviewing application is accessed by the print shop operator to review the document and submitter's annotations.

23 Claims, 6 Drawing Sheets

OTHER PUBLICATIONS

J.O'Neill, et al., *Asymmetrical Collaboration in Print Shop-Customer Relationships, Proc. 10th* European Conference on Computer Supported Cooperative Work (*ECSCW*), 2007.

G.Woolfe, et al. *Natural Language Color Editing, XIG Conference 2006*, pp. 122-125 (2006) available at www.xerox.com/innovation/simple_color.pdf.

J.C.King, *Why Color Management?, Adobe Systems Incorporated*, http://www.color.org/whycolormanagement.pdf, downloaded Jan. 25, 2008.

Kodak Insite Creative Workflow System, http://graphics1.kodak.com/global/product/workflow_data_storage/printing_solutions/synapse/synapse_teamworks/default.htm, downloaded Jan. 25, 2008.

http://www.imarkup.com/client/pdf_markups.asp, downloaded Jan. 18, 2008.

Blind Review, *Colour is a Socio-Technical Problem*.

www.imarkup.com/docs/workflow.pdf.

Kodak Insite Prepress Portal System.

\* cited by examiner

PRINT MEDIATOR

CROSS REFERENCE TO RELATED PATENTS AND APPLICATIONS

The following copending applications, the disclosures of which are incorporated herein in their entireties by reference, are mentioned:

U.S. application Ser. No. 11/801,230, filed May 9, 2007, entitled PRINT JOB AESTHETICS ENHANCEMENTS DETECTION AND MODELING THROUGH COMBINED USER ACTIVITY ANALYSIS AND CONTENT MATCHING, by Luca Marchesotti, et al.

U.S. application Ser. No. 11/712,094, filed Feb. 28, 2007, entitled HARD COPY OUT OF GAMUT DETECTION, by Patrick R. Harrington.

U.S. application Ser. No. 11/635,741, filed Dec. 7, 2006, entitled PRINTER JOB VISUALIZATION, by Rajinderjeet Minhas.

BACKGROUND

The exemplary embodiment relates to the field of digital image processing. It finds particular application in a distributed printing system, in which a remote submitter of a print job interacts with an operator of a printer, for reducing the amount of time spent in proofing operations to improve a print job's perceptual quality, and will be described with particular reference thereto.

One of the goals of digital color management technology is to preserve the customer's perceptual intent when color documents are rendered on different devices, such as RGB displays and color printers. One problem is that the color gamut and emulation profiles of the printer limit the range of colors which can be printed. In some cases, the customer and printer may make coordinated use of the International Color Consortium (ICC) color profiling protocols. The ICC protocols are meant to ensure that color is rendered consistently across all devices. However, in order to use this technology properly and to achieve good results, every agent involved in the document lifecycle needs to adhere to a set of protocols and procedures which include correct and regular calibration of all devices and appropriate profiling and tagging of all digital documents involved. Achieving this also requires specialized color management knowledge and expertise. Common industry practice in color document production workflows does not adhere to these standards due to their complexity to implement. As a consequence, specifications and tolerances from the document initiator/designer to the printer are rendered differently on different devices and remain ambiguous throughout the workflow, with designers submitting files to printers without usable color management information, and printers manipulating document color without clear knowledge of the customer's intent.

When multiple copies are to be made, the print shop often generates a proof, which is a hardcopy of the document, to allow the customer to judge whether the rendered document matches expectations. This may proceed through several iterations with the customer providing notes or comments generated as feedback from previous iterations.

This process can require a large number of single-print tests (proofs) and is quite time consuming as each test must be manually set up and initiated on the printer's digital front end (DFE). At each iteration, the operator prints the document, trying to follow any specifications given by the submitter, and selecting several print settings available at the DFE, often in a fairly ad hoc manner, and sends the best result back to the submitter as a hard proof. The end result is that a digital color production workflow requires close collaboration between document creators and printers, and a costly and often iterated exchange of proofs in order to achieving pleasing color in the final product. This is a problem for the digital print industry, as the current workflow means the expected benefits of automation and efficiency have not been realized for key applications such as high quality, short-run, on-demand printing. It also represents a problem for commercial print shops in that it ties up the printing system in the repeated production of test prints, a process that is costly, time consuming, and an inefficient use of a digital printer that is designed not as a proofing machine, but for optimal performance over extended runs.

INCORPORATION BY REFERENCE

The following references, the disclosures of which are incorporated herein in their entireties by reference, relate generally to color proofing and pre-press color matching methods: U.S. Pub. No. 2007/0008557, published Jan. 11, 2007, entitled METHOD FOR REMOTE PROOFING OF DFE COLOR ARCHITECTURE, by Harrington, et al.; U.S. Pub. Nos. 2007/0008558 and 2007/0008559, published Jan. 11, 2007, both entitled METHOD FOR PREPRESS-TIME COLOR MATCH VERIFICATION AND CORRECTION, by Rumph, et al.; U.S. Pub. No. 2007/0008560, published Jan. 11, 2007, entitled METHOD FOR PREPRESS-TIME COLOR MATCH VERIFICATION AND CORRECTION, by Eschbach; and U.S. Pub. No. 2007/0109569, published May 17, 2007, entitled DETERMINING THE COLOR MATCH BETWEEN IMAGE DATA AND GRAPHICS OBJECTS, by Eschbach, et al.

The following references, the disclosures of which are incorporated herein in their entireties by reference, are also mentioned:

U.S. Pub. No. 2008/0068626, published Mar. 20, 2008, entitled COLOR IMAGE GAMUT ENHANCEMENT PRESERVING SPATIAL VARIATION, by Bala, et al., discloses receiving an image characterized by an original image gamut in an imaging device. The original image gamut is converted to a first set of modified color values that occupy a greater fraction of the imaging device's gamut than the original image gamut. The modified color values of each pixel are mapped to new color values within the device gamut.

U.S. application Ser. No. 11/640,688, filed Dec. 18, 2006, entitled A METHOD AND SYSTEM TO DETERMINE PREFERRED COLOR MANAGEMENT SETTINGS FOR PRINTING DOCUMENTS, by Wolfe, et al., discloses a system and a method for generating a single job that tests multiple image path parameter combinations on selected document parts. The system builds a menu listing all the available image path control parameters and settings that are compatible with the selected document parts and the user chooses the image path control parameters and settings combinations that are to be tested.

U.S. Pat. No. 6,344,902, entitled APPARATUS AND METHOD FOR USING FEEDBACK AND FEEDFORWARD IN THE GENERATION OF PRESENTATION IMAGES IN A DISTRIBUTED DIGITAL IMAGE PROCESSING SYSTEM, by Duke, et al., discloses a system for generating predictable, reproducible, and pleasing images in a distributed digital image processing system which monitors presentation images and provides feedback to a customer that assembled the original image. The originating customer can view the image as it appears on a remote output device and/or adjust the image so that the presentation image will match the image appearing on the image originating device.

U.S. Pat. No. 6,803,921, entitled USE OF SOFT PROOFING TO ASSIST IN THE RENDERING OF IMAGES OF UNKNOWN COLORIMETRY, by Balasubramanian, et al., discloses a softcopy proofing system in which an image or document of unknown colorimetry can be soft proofed iteratively using a range of different source profiles, rendering intents, and color adjustments. The procedure is performed using a softcopy proofing device rather than on the actual press.

U.S. Pub. No. 2008/0079964, entitled CRITICAL COLOR TOLERANCE GUIDE FOR PRINTERS, by Woolfe, et al., discloses a method of identifying color tolerances in a pre-press document.

BRIEF DESCRIPTION

In accordance with one aspect of the exemplary embodiment, a print mediator includes an interface module which serves as an interface for a document to be submitted for printing, the interface module communicating with an associated printing infrastructure for acquiring color rendering information for a print queue of the printing infrastructure. A first reviewing application is capable of communicating with the interface module for receiving the acquired color rendering information. The first reviewing application generates a visual representation of a document to be submitted for printing based on the color rendering information communicated by the interface module, the first reviewing application detecting problems relating to color rendering by the printing infrastructure and proposing corrections for the problems. The first reviewing application is configured for displaying the visual representation on a first display and for receiving, as input, a first user's annotations to the document and for receiving the first user's decision on the proposed corrections. At least one of the first reviewing application and a second reviewing application is capable of communicating with the interface module for enabling a second user to review the document on a second display after it has been submitted to the interface module.

In another aspect, a method of managing color rendering problems includes accessing a print queue of a printing infrastructure with an interface module to acquire color rendering information, communicating the acquired color rendering information between the interface module and a first reviewing application. With the first reviewing application, the method includes detecting problems relating to color rendering by the printing infrastructure for a document to be submitted for printing, generating a visual representation of the document to be submitted, based on the acquired color rendering information and detected problems, and generating corrections for the detected problems. The visual representation is output to a first display. The method further includes providing for a first user to select whether to accept the corrections and to annotate the document and submitting the optionally annotated and corrected document to the interface module. With at least one of the first reviewing application and a second reviewing application, the method further includes generating a visual presentation of the submitted document; and outputting the visual representation to a second display for review by a second user.

In accordance with another aspect, in a distributed printing network comprising a printing infrastructure and first and second computing devices, the first computing device being remote from the printing infrastructure, each of the computing devices comprising memory, a processor and an associated display, a print mediator is provided. The print mediator includes an interface module which serves as an interface for a document to be submitted for printing by the printing infrastructure, the interface module communicating with the printing infrastructure for acquiring color rendering information which affects how colors of the document will be rendered by the printing infrastructure. Each of the first and second computing devices host or access a reviewing application whereby the interface module communicates the acquired color rendering information to the respective computing device. The reviewing application generates a visual representation of the document to be submitted for printing based on the color rendering information communicated by the interface module. The reviewing application detects problems relating to color rendering by the printing infrastructure and proposes corrections for the problems. The reviewing application displays the visual representation on the respective display and receives a user's input annotations to the document and decision on the proposed corrections.

DETAILED DESCRIPTION

The exemplary embodiment relates to print mediator, to a distributed printing network which includes the print mediator, and a method for managing color rendering problems by document proofing. The print mediator facilitates the workflow between a submitter of a color document and the operator of a digital production printer with the aim of quickly obtaining an acceptable printed version of the color document. The print mediator aids in managing color in the digital production printing workflow based on the exchange of annotations on the document to be printed specifying intent and requirements with respect to color rendering.

The exemplary print mediator facilitates reviewing and adjusting color information starting at any stage of the document life cycle and is especially appropriate for solving problems when reaching the submission stage. With its particular combination of functionalities, the print mediator allows the document submitter to resolve various color problems more quickly and thus to obtain an acceptable print out more quickly.

The exemplary print mediator serves to address some or all of the following related issues, which have been observed in digital production print shops:

1. Graphic designers are generally unaware of features or limitations of the printing technology that will be used to produce their work. Accordingly their work often contains graphic elements that cannot be successfully printed or they fail to take advantage of printer capabilities that could enhance their work.

2. The vast majority of documents submitted to print shop do not contain useful color management information (e.g., tagged profiles).

3. Even when documents contain color management information, printers are reluctant to trust it, and often discard it.

4. Printers lack an efficient method to achieve the correct color using adjustments available on the DFE.

5. DFEs lack the sophisticated color adjustment tools that are often required to achieve the necessary image quality.

Furthermore, even where color management protocols are in place and used correctly, achieving pleasing color with digital production printing can remain difficult due to device gamut limitations and destination device independent document creation. The gamut is the range of colors that a device is capable of rendering. Different devices have different gamuts and are therefore unable to reproduce the same set of colors. In particular, various widely used spot colors are sometimes out-of-gamut of digital printing devices. Therefore, the submitted documents often contain colors that cannot be correctly reproduced when printed on a digital printer. These colors are generally mapped into the gamut of the printing device. However, the way in which this is done may not always be the one preferred by the document submitter. For example, the submitter may consider it more important that a color is kept as a blue color than finding the color with the nearest Euclidean distance to the out-of-gamut color.

The exemplary print mediator addresses some or all of these problems by providing the following set of functionalities: it provides all users (designers and other submitters as well as print shop operators) with an awareness of printer capabilities and constraints through comparative soft proofing, semi- or fully automatic problem detection, semi- or fully automatic problem correction, annotation capabilities allowing the specification of intent, concerns, requirements, and priorities with respect to the submitted document (and its components). It also provides the printer operator with awareness of submitter intent, concerns and so forth. It provides annotation capabilities allowing comment and feedback on issues related to the submitted document and its component parts.

Further, in addition to the functionalities provided by a conventional soft proof system, the exemplary print mediator detects and corrects for differences in rendering engine (e.g., Adobe versus DFE) and color settings (e.g., simulation of spot colors and profile substitution rules).

In the absence of end-to-end color management, as proposed by the ICC, the exemplary print mediator allows users to solve color-related problems and to reach a pleasing color faster. While the print mediator is not intended as a replacement for the ICC Color Management protocols (in particular, it does not support strict calorimetric specifications), it provides support at a higher level to complement the ICC model when it cannot be practically applied in the workflow.

A "print job" or "document" is normally a set of related sheets, usually one or more collated copy sets copied from a set of original print job sheets or electronic document page images, from a particular submitter, or otherwise related. The print job may include or be associated with a job ticket which includes submitter information and other information on the job type as well as providing printing instructions.

A "color profile" is a mathematical transform that characterizes the way in which the specific color rendering space of a device or of a standard color space is converted into a device independent color space. A source color profile is applied to the color values of a digital document in order to translate them into a device independent color space. An output color profile is applied to the device-independent color values of a digital document in order to translate them into color values meaningful for the corresponding output device, such as a printer or display device.

The "output color space" characterizes the possible colors of a given output device. Colors which cannot be reproduced with a predetermined accuracy are considered to be out-of-gamut for the output device. In general, display devices have a gamut which covers a larger range of colors than a printer. For a printer, the set of colors in the output color space is a function of the colorants available in the output device as well as on the level of coverage of the substrate which can be achieved.

The output device may further be provided with one or more emulation modes. An emulation mode is a color profile that does not characterize the output device but instead characterizes the color space of another type of device or a standard color space. Each emulation mode performs a mapping between color values of the colors of an input image and corresponding color values for the particular emulation mode before the color transform corresponding to the device profile is applied. The set of available colors in a particular emulation mode constitutes the "emulation space". Each emulation mode, where more than one mode is available, applies slightly different algorithms for matching input colors to color values within its color space. Because the different emulation modes typically have different color gamuts, a color which is out-of-gamut for purposes of one emulation mode may be within gamut for another emulation mode. Exemplary emulation modes include SWOP (Specifications for Web Offset Publications), FOGRA, GRACoL, ISO-Coated, Euroscale, Japan CMYK, and the like. While the colors provided by the color profile of the particular emulation mode generally fall within the printer's gamut, a portion of the colors may be outside the printer's gamut. Thus, only those colors which fall within the volume represented by the intersection of the selected emulation mode's gamut and the gamut of the printer are accurately rendered. Other colors may be considered out-of-gamut for the printer in the particular emulation mode selected.

Figure 1:
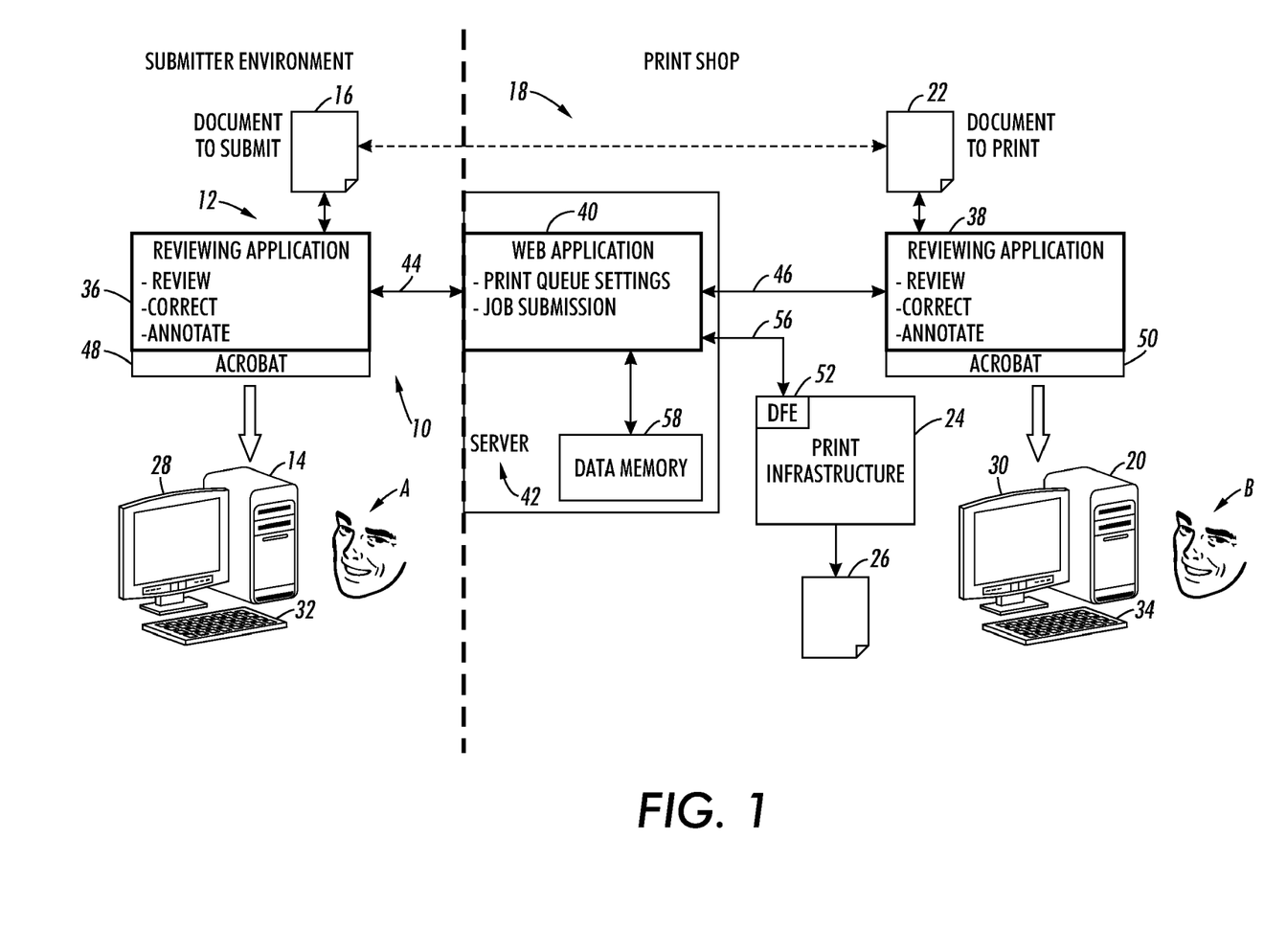
FIG. 1 is a functional block diagram of a distributed printing system in which a print mediator operates in accordance with one aspect of the exemplary embodiment.
Figure 2:
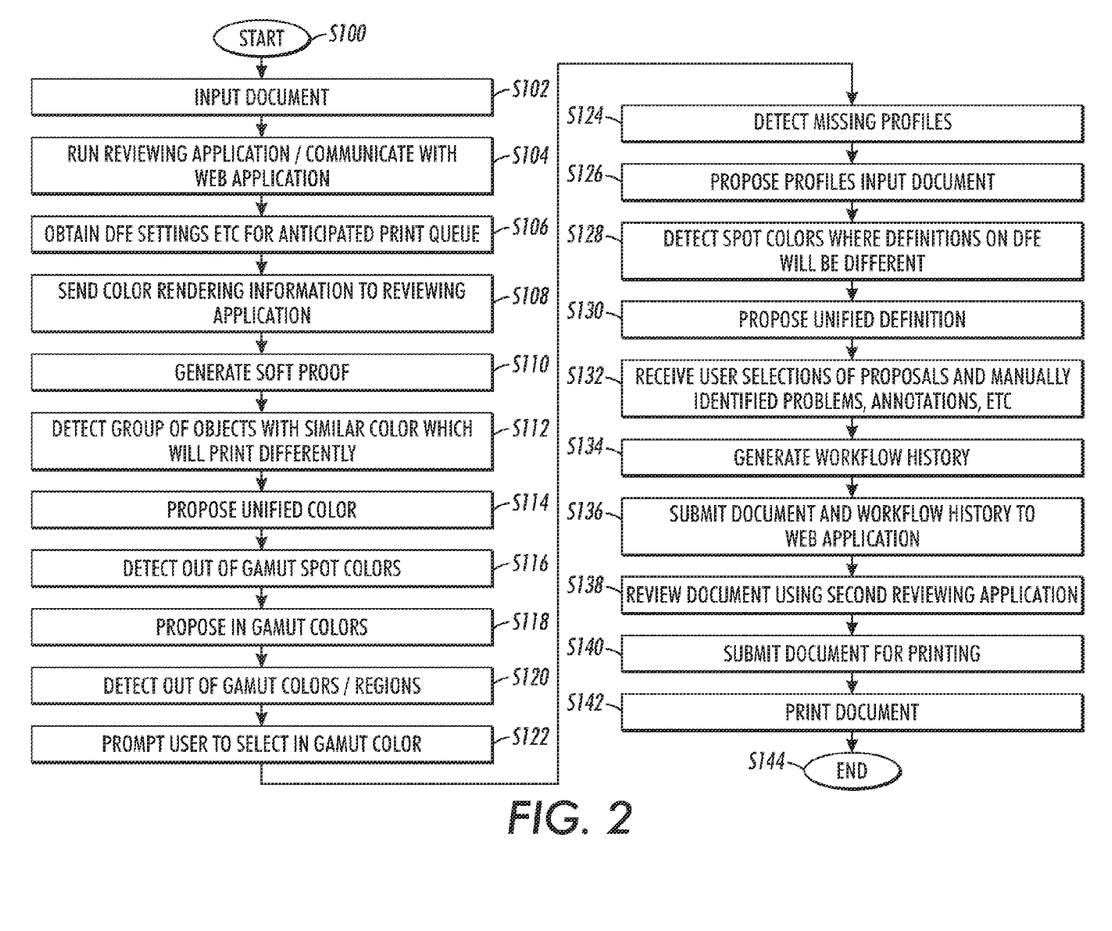
FIG. 2 is a flow diagram of a document proofing method utilizing the exemplary print mediator in accordance with another aspect of the exemplary embodiment.

FIG. 1 illustrates an exemplary distributed print network 10 in which an exemplary print mediator 12 operates. An exemplary method of proofing a document which utilizes the print mediator is shown in FIG. 2.

A first user A of the print mediator (typically a customer or document designer who will submit the document) which for convenience may be referred to as the submitter, working on a first workstation 14 in a submitter environment, generates an original document 16, which is to be submitted as a print job to a remote print shop 18 for proofing and/or printing. A second user B of the print mediator 12, such as the print shop operator or a pre-press agent, working on a second workstation 20, e.g., at the print shop, reviews the submitted document 16. The operator B prepares the submitted document as a document 22 for printing on a printing infrastructure 24. The printing infrastructure 24 can include any suitable printing device or devices for printing the document in tangible media, such as a digital production printer. The printer 24 outputs a printed document 26 on print media by applying colorants, such as inks or toners, to the print media. Workstations 14, 20 may be general purpose computers or dedicated computing devices, each with memory storage and processing capability. Each workstation may include a visual display 28, 30, such as an LCD screen, and a user input device 32, 34, such as an alphanumeric keyboard, keypad, touch screen, cursor control device, or combination thereof. A user A, B can review a document on the respective display 28, 30 as well as apply or review annotations.

The print mediator 12 acts as a mediating interface between the submitter A and the print shop operator B. The print mediator 12 includes two (or three) components: a first reviewing application 36, which may be hosted by the submitter's workstation 14 (resident thereon) or otherwise accessible thereto, optionally a second reviewing application 38, analogous to the first, which is hosted by or otherwise accessible thereto the operator's workstation 20, and an interface module, here shown as a web application 40, which may be hosted on the printer's public site, e.g., by a suitable computing device 42, such as a server or general purpose computer with memory storage and processing capability. In another embodiment, the web application 40 may be resident elsewhere in the system 10, such as on the workstation 20, in the digital front end (DFE) of the printer 24, or the like. As will be appreciated, while FIG. 1 illustrates a single submitter workstation 14 and a single operator workstation 20, in practice, a plurality of submitters and/or operators working on respective workstations may communicate via a single web application 40.

The components 36, 38, 40 of the print mediator 12 may be embodied in hardware, software, or combination thereof. In the exemplary embodiment, the print mediator components comprise software instructions which, when executed by a processor of a respective host computing device 14, 20, 42, perform the method described herein. The server 42 may be linked to the workstations 14, 20 by suitable wired or wireless links 44, 46, such as cables, telephone lines, a local area network, or a wide area network, such as the Internet.

Reviewing applications 36, 38 may be substantially identical and may both include reviewing, correcting, and annotating functions, described in greater detail below. By substantially identical, it is meant that the second reviewing application 38 has at least the functionality provided by the first 36 for reviewing, annotating, and optionally also correcting documents. Each workstation 14, 20 may also host a conventional document viewing/generation component 48, 50, such as Adobe™ Acrobat™. Such a software program permits viewing, creation, editing, and interchanging documents in a common interchange format, such as Adobe's Portable Document Format (PDF). The reviewing program 36, 38 may be a plug-in for the respective document viewing/generation component 48, 50. In another embodiment, a single reviewing application 36 may alternatively be hosted by a server, which is accessible to one or both workstations 14, 20, e.g., though a web browser.

The exemplary interface module 40 has two functionalities. First it provides an interface for submitting print jobs. In particular, the interface module allows documents 16, 22 to be transferred between the submitter and print shop operator. The interface module 40 thus provides a communication link for transfer of documents 40 between the two workstations 14, 20. Second, the interface module 40 acquires color rendering information from the printing infrastructure 24, specifically, for the print queue which is predicted to be used for printing the document. A printing infrastructure 24 may have one or more print queues, each using a different printing device or combination of devices which may be configured differently. Color rendering information may include any information which may influence the way in which colors are rendered by the printing infrastructure 24 and, in particular, for the selected print queue. For example, the web application 40 provides access to the printer queue's settings. In one embodiment, the web application 40 has access to the DFE 52 of the specific printer 24 to be used in printing the document and acquires, from the DFE, information on the source profile of the printer, emulation modes available on the printer, and other settings of the particular printer which may influence the printer's ability to render colors, and the way in which the printer will handle out-of-gamut colors. As illustrated in FIG. 1, the web application 40 may be linked to the printer 24, directly or indirectly, e.g., via a wired or wireless link 56. Periodically, the web application 40 may update information of the printer settings and store the information in associated data memory 58.

The document submitter A utilizes the first reviewing application 36 when submitting the print job 16 (e.g., a PDF document) to the print shop. The reviewing application 36 allows reviewing, annotating, and correcting the documents to print at submission time. The reviewing application 36 identifies potential issues which may arise when printing the document. The reviewing application 36 also assists the submitter in either applying immediate corrections or linguistically communicating requirements to the printer, e.g., as annotations. The printer operator B uses the second reviewing application 38 to visualize the submitted document together 16 with the requirements (e.g., annotations) created by the submitter. The operator can also add annotations or comment on the annotations already attached to the document.

Figure 3:
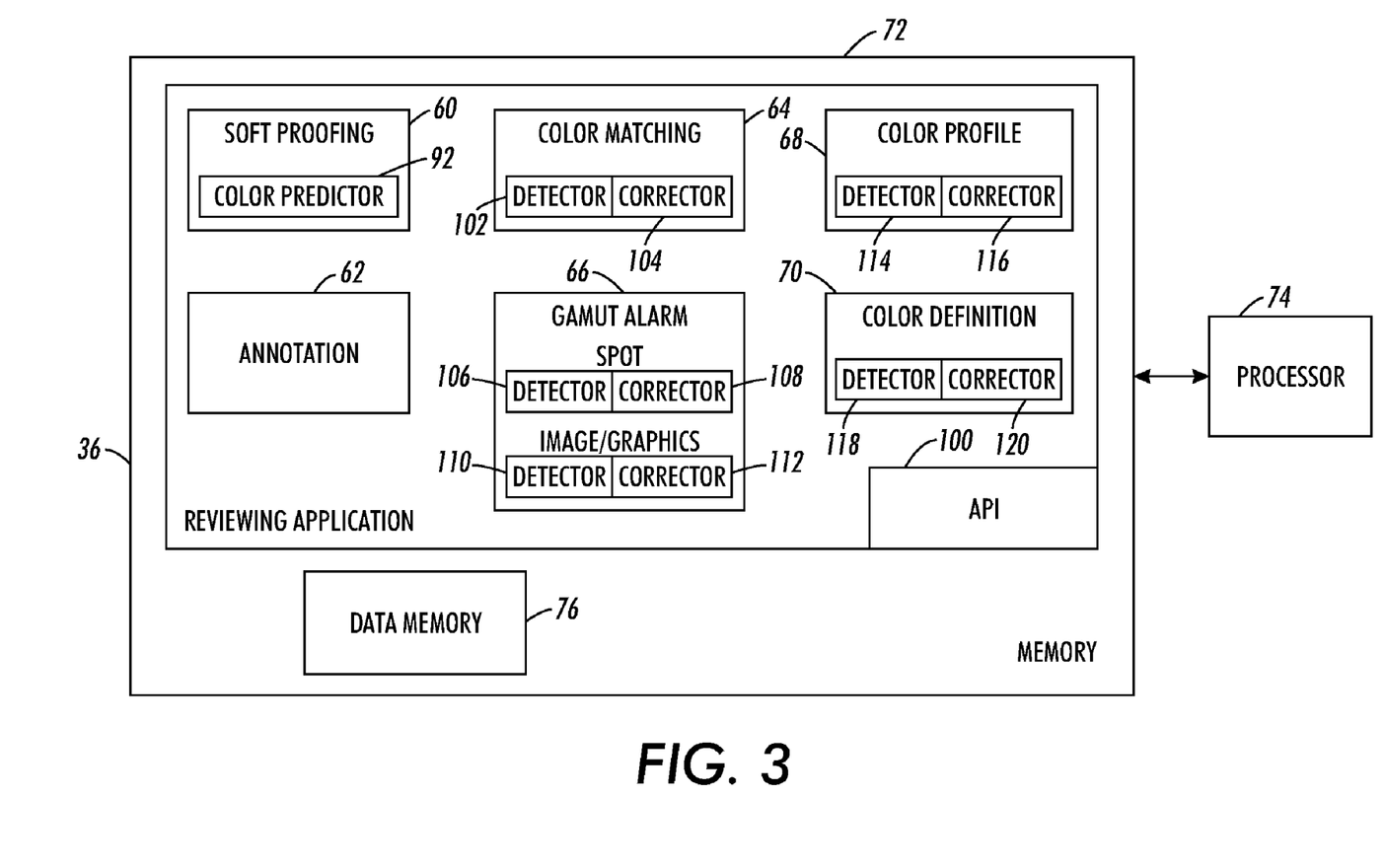
FIG. 3 is a functional block diagram which illustrates components of the print mediator of FIG. 1.

Some of the functionalities of the print mediator 12 will now be described in greater detail. As will be appreciated, the print mediator may provide fewer than all of the functionalities described herein. As shown in FIG. 3, the reviewing application 36 includes a set of components which assist the submitter in reviewing, correcting, and annotating the document to be submitted for printing. These components may be embodied in software, hardware, or a combination thereof and may be physically located either on the respective workstation and/or accessible thereto, e.g., via a web browser. Reviewing application 38, where present, may be similarly configured to reviewing application 36, and thus will not be described in detail.

The reviewing application 36 may include a soft proofing component 60, an annotation component 62, and a plurality of plug-in components 64, 66, 68, 70 for detecting/correcting potential mismatches between the submitted document 16 and the printed document 26. In particular, each reviewing application may include a color matching component 64, an out-of-gamut component (gamut alarm) 66, a color profile component 68, and a color definition component 70. The components 64, 66, 68, 70, may each include one or more detectors for detecting a problem with the document 16 and one or more correctors for proposing modifications to the document for correcting a problem identified by the respective detector. Further details of these components are described below.

In the exemplary embodiment the components 60, 62, 64, 66, 68, and 70 are stored as software instructions in the workstation's computer memory 72 and are executed by a processor 74 of the workstation in communication with the memory 72. Data memory 76, within or separate from memory 72, stores a document 16 while being processed by the reviewing application.

The memory 72 may represent any type of computer readable medium such as random access memory (RAM), read only memory (ROM), magnetic disk or tape, optical disk, flash memory, or holographic memory. In one embodiment, the memory 72 comprises a combination of random access memory and read only memory.

Comparative Soft Proofing

Soft proofing is a mechanism that allows simulating, on the computer monitor 28, what a print out will look like once on paper, highlighting the problematic areas in the soft proof. In the exemplary embodiment, the soft proofing component 60 allows viewing the document 16 through the printer's color space, taking into account the gamut as well as other characteristics of the inks or toners used.

Figure 4:
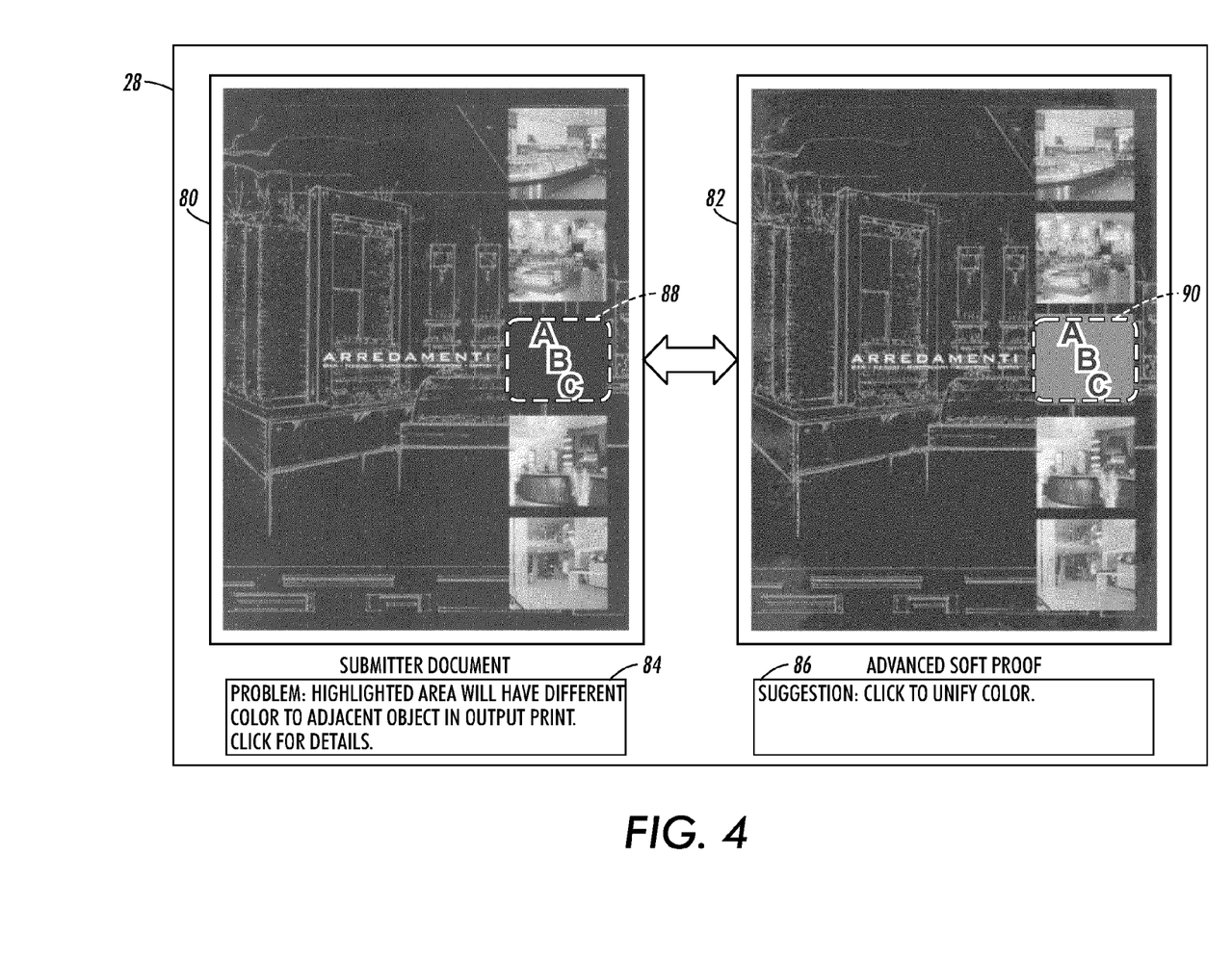
FIG. 4 illustrates a screen shot of a screen generated by the exemplary print mediator for an original document showing a representation of a predicted mismatch in color between the document and a printed document derived therefrom.

The exemplary print mediator 12 visualizes the current version of the document 16 to be submitted and a soft proof of the document 26, when printed. These representations may be arranged side by side, as illustrated in FIG. 4 for displaying contemporaneously to the viewer. For example, the user's screen 28 is caused to display a representation 80 of at least a portion of the original document 16 next to a representation 82 ('soft proof') of a printed version 26 of the same portion of the document, highlighting one or more identified problems. In the exemplary screen shot, a problem statement 84 is displayed, which briefly describes the problem. The user may click on the statement for more details. A solution statement 86 is also displayed which identifies a proposed correction. As will be appreciated, the manner in which the problems/solutions are displayed is not limited to any particular representation and may be displayed visually and/or aurally in addition to or in place of displayed text.

Wherever the two versions of the document are predicted to differ substantially, problematic areas may be automatically annotated and/or highlighted. For example, as shown in FIG. 4, a region 88 of the submitted document representation 80, where the identified problem occurs, is highlighted, here with a border of a contrasting color. A corresponding region 90 of the output document representation 82 is also highlighted to demonstrate the problem. The color of the region 90 (and/or 88) may be modified to emphasize the problem.

In one embodiment, the soft proofing component 60 includes a color predictor 92, which predicts the output color based on the information acquired by the web application 40 from the DFE 52, which in turn, is communicated to the reviewing application 36. The soft proofing application 60 can therefore produce a very advanced simulation of the print result. The color predictor 92 thus takes into account the actual settings of the print queue to be used in printing the document. Existing soft proofing tools generally available to a document submitter do not take into account any digital front end (DFE) specific processing. The exemplary color predictor 92 converts the color of all objects within a document file into device CMYK color space in the same way the DFE does, using the same resources that the DFE uses.

Existing soft proofing systems deal with the colorimetric properties of print and display, mostly manifested through gamut differences. The exemplary print mediator 12 adds the dimension of differences in rendering engine (e.g., Adobe versus DFE) and color settings (e.g., simulation of spot colors and profile substitution rules) to the soft proofing component 60.

The soft proofing component 60 also provides comparative soft proofing, by highlighting differences between the submitted version and the printed version. Therefore, in contrast to traditional soft proofing which works only if the user's monitor is calibrated, the exemplary soft proofing component 60 highlights differences without requiring a calibrated screen. Calibration will however, improve ease of reviewing.

The user can interact with the soft proofing component 60 for correcting or annotating problems. For example, in the embodiment illustrated in FIG. 4, the user may accept or reject the proposed color unification. In the embodiment illustrated in FIG. 5, the user may chose to annotate the document, by clicking on a displayed annotation icon 96 which actuates the annotation component 62.

In addition to responding to automatically detected corrections, the reviewing application 36 allows the user to identify problems not otherwise identified. When comparing the representations 80, 82 of the original document and the predicted print result visually, the designer is able to interactively select objects/areas within the document where the document transformations introduced during printing result in problematic changes. The resulting selected objects/areas are made visible and accessible on the document display similar to the automatically detected regions.

Annotation Component

The annotation component 62 allows the user to attach annotations to the document which are displayed to the print shop operator through the corresponding functionality on the reviewing application 38. The user can annotate selected areas/objects. An annotation 96 (FIG. 5) may specify a problem observed and/or a required correction. To specify an annotation, the user may select a problem category within a predefined taxonomy (e.g., via a dropdown menu 98) and/or, if the specific problem category is not readily available, he or she may enter a textual description. An annotation can be further qualified or quantified by specifying a tolerance and a priority for the correction. The tolerance indicates a threshold up to which the problem might be acceptable. The priority provides a ranking of problems/solutions which helps the operator to find a good compromise whenever the required correction conflicts with the correction of other problems.

The various annotations over time are tracked and stored in memory 72. The individual annotations may be organized in revisions. A revision includes a timestamp, an author identifier, a workflow stage, the print queue settings forecasted, and the actual content of the annotation at that time. All the annotations attached to a document 16 together with their revisions constitute the document workflow history and can be displayed at any time to the application user (e.g., submitter or operator). This can help, for example, the printer operator to understand the designer's intent and follow his or her requirements.

Problem Detection and Correction

The print mediator 12 allows the detection and correction of various types of color related problems. For a given type of problem, dedicated problem detectors identify areas or objects exhibiting this problem. As a consequence, the detectors automatically create a corresponding annotation and visualize it on the document display (similar to the problematic areas/objects and the corresponding annotations introduced manually by the designer as described above). One or more dedicated problem correctors can also be available for each problem type and, if the designer applies it, can correct the problem by modifying the document 16. To enable the integration of such "smart plug-ins," (here illustrated as a color matching component 64, a gamut component 66, a color profile component 68, and a color definition component 70) the print mediator provides a dedicated application program interface (API) 100.

Table 1 illustrates exemplary problems and detectors and correctors which the reviewing application 36, 38 may incorporate, and which are described in greater detail below.

TABLE 1

| PROBLEM | DETECTORS | CORRECTORS |
|---|---|---|
| Color Mismatch between objects Objects should have identical color | Color Match Detects groups of objects that have the same (or very similar) color in the original document but a different color in the printed version | Color Unifier Unifies the color for all (or some) of the concerned objects |
| Out-of-Gamut (Spot Color) Spot color that cannot be reproduced correctly on the printer device | Gamut Alarm (Spot Color) Detects out-of-gamut spot colors/regions | Closest Spot Color Selector Proposes closest within gamut spot colors |
| Out-of-Gamut (Image/Graphics) Color that cannot be reproduced correctly on the printer device | Gamut Alarm (Image/Graphics) Detects out-of-gamut colors/regions | Document Editing Natural language color editing is particularly appropriate to solve this problem in the proposed system |
| Missing Profile (Image/Graphics) Missing Color Profiles cause each device to use a default Color Profile that may be inappropriate | Profile Checker Detect whenever the document as a whole or some components have no associated Color Profile | Profile Adapter Propose alternative color profiles |
| Spot Colors with different definitions The spot color definitions are different between the DFE and the designer reference | Spot Color Checker Detect when a spot color has different definitions | Spot Color Editing Propose the choice of printing to match the designer swatchbook definition, or any other appropriate definition of the color |

1. Color Matching Component

The color matching component 64 includes a detector 102 and a corrector 104. The detector 102 may be configured similarly to that described in any one of U.S. Pub. Nos. 2007/0008560, 2007/0008559 and 2007/0008558 to Rumph, the disclosures of which are incorporated herein in their entireties by reference.

Most electronic documents to be printed or output on a particular device include multiple elements, such as text, photos, graphics and the like. Many electronic documents are a composite of other smaller documents and elements. For example, photos may be pasted into a largely text document at different locations. Color graphics and monochrome images may occur on the same page. The individual elements of an electronic document that are intended to match in color may be represented in a variety of color spaces, a situation which may arise, for example, because those elements are derived from prior documents of differing origins. This situation may not be immediately apparent to the user, because the colors of the objects appear to match on the display or when printed on the user's own printer. The detector 102 detects groups of objects that have the same (or very similar) color in the original document but different colors in the printed version.

Accordingly, one problem which may be detected by the detector 102 arises when color transformation is involved, such that different source color definitions take different color transformation paths. For example, if one object's color is specified in sRGB, and another object's color specified in SWOP (Specifications for Web Offset Publications) CMYK, the color processing needed to produce the device CMYK for the specific marking process may produce a different device CMYK value for the two objects. This may be due to differing black generation/black preservation strategies, even if the two objects would have matched exactly on a SWOP press (where no conversion of the SWOP CMYK would have been necessary). The exemplary color match detector 102 thus identifies, for example, objects in a document whose colors match in typical offset printing color spaces (e.g. SWOP), but no longer match when processed for digital printing. This allows modifying the problematic objects color values to achieve perfect matches.

In one embodiment, the detector 102 analyzes colors of objects in the document for mismatches. For each object in the document (excluding sampled images), the object's colors are converted to a common color space, e.g., using a simple, ICC-based approach. That is, the source color is converted into a profile connection space (PCS) using a source ICC profile, and then the PCS representation is converted to the common color space using an output profile, e.g., a printer profile. Objects in the document may be then clustered into groups or sets that have matching colors in the common space. Matching is determined according to some first tolerance range by comparing the color values generated as a result of the transformation for the particular objects. If the numeric values are within the first tolerance range, the colors are deemed to match. If not, the detector detects a mismatch. The detector functionality of the color match component therefore generates annotations indicating the concerned objects and the identified color variation problems. The tolerance can be specified in terms of color variance allowed within a group. The corrector 104 generally proposes, as a correction, to unify the color specification of different objects belonging to a group in the original document so that they will appear with the same color also in the printed version. The corrector 104 may propose the unify color action to the designer for each object group. The submitter can then decide to unify the color for all (or some) of the concerned objects or to ignore the problem. Each action is attached to the corresponding annotation.

2. Gamut Alarm

The exemplary gamut alarm 66 is a tool that indicates which colors within a document are outside a selected printer's color gamut. The exemplary gamut alarm includes a detector 106 and corresponding corrector 108 for out-of-gamut spot color and another detector 110 and corrector 112 for out-of-gamut image/graphics objects. Whilst the detection of out-of gamut color is similar for both spot colors and other colors contained in images or graphics, the corrections that can be applied differ.

In the soft proof representation, the problematic region(s) may be visualized and may be automatically annotated with corrections proposed by the corrector 108, 112. Alternatively or additionally, the user is permitted to suggest a solution for solving the out-of-gamut problem.

One method for representing out-of-gamut colors, which may be adapted for use in the present system, is disclosed in above-mentioned application Ser. No. 11/712,094, by Patrick R. Harrington. In the exemplary method, the soft proof identifies the colors of the original image that will be out-of-gamut for both the emulation mode and output profile for the designated print queue.

It is to be appreciated that the same underlying problem can be detected by different detectors resulting in different interpretations and suggested solutions. For example, a given object can be detected by the color match component as being no longer similar to a second object in the printed version and a unification proposed. Additionally, the object may be detected as being out-of-gamut by the gamut alarm and a gamut mapping to a new color proposed. Indeed, it may have been the out-of-gamut mapping which resulted in the first problem. The visualization allows both problems to be addressed at the same time.

3. Missing Profile

The color profile component 68 includes a detector 114 which detects whenever the document as a whole or some portions thereof have no associated color profile. When no color profile is attached, each rendering process uses a default profile that may be different across processes and thus lead to different renderings. An associated corrector 116 proposes alternative color profiles from which the user can select a suitable one (e.g., SWOP, FOGRA, GRACoL, ISOCoated, Euroscale, Japan CMYK).

4. Spot Color

The color definition component 70 includes a detector 118 which detects when a spot color has different definitions in the document and DFE of the print queue and a corrector 120, which proposes a choice of printing to match the designer swatchbook definition, or any other appropriate definition of the color. The correction may consist in practice of selecting, among the color definitions in the neighborhood, another color definition of the printer that better matches the original color intent on the printed version.

5. Other Optional Components

The reviewing application 36, 38 may include other components for detecting/correction problems. As examples: a) A component for critical color analysis algorithmically determines the most important colors in a document and provides specific tools and features for controlling and optimizing these colors. b) A subset proofing component selects a subset of the document for soft proofing. This enables efficient proofing of subsets of large documents and enables faster and less expensive proofing and correction. c) A design assistance tool assists with color harmony, image selection, visual impact and the like.

Other tools may be provided that allow designers to incorporate special capabilities of printing devices in their document file. Examples of such special capabilities include the Specialty Imaging suite of technologies developed by Xerox, which provides such features as MicroText (text printed as small as 0.03 cm), GlossText® (text is not visible under direct viewing but becomes visible as gloss under inclined illumination), CorrelationMark (text is visible only when a key transparency is placed over the text), FluorescentMark (text is visible only under UV/black light), and the like.

With reference now to FIG. 2, an exemplary method of document proofing which may be performed in the distributed system of FIGS. 1 and 3 will now be described. As will be appreciated, the steps of the method need not all proceed in the order illustrated and fewer, more, or different steps may be performed. The method begins at S100.

At S102, the reviewing application is actuated. A designer A who wishes to submit a document 16 for printing to a print shop 18 or other remote printing service accesses the reviewing application 36, either by running the application from memory 72 on his workstation or by opening a web browser which provides access to the reviewing application via a network, such as the Internet.

At S104, the reviewing application 36 receives the document to be submitted and initiates communication with the interface module 40.

At S106, which may occur at one or more times throughout the method, the interface module 40 communicates with the printing infrastructure 24 to identify a print queue for the print job 16 and the current or anticipated settings of the DFE 52 which may influence the color of a rendered document 26.

At S108, the interface module 40 communicates information on the print queue settings to the reviewing application 36. This step may be repeated throughout the workflow, for example, if the anticipated print queue or its DFE 52 settings are changed.

At S110, the reviewing application 36 generates a soft proof of the rendered document, based on the information provided by the interface module, and presents a side by side representation 88, 90 of the original document and printed document for the user to review on the screen 28, in which predicted color differences between the original document and rendered document are identified with annotations and/or highlighting.

At S112, the reviewing application 36 detects and identifies groups of objects that have the same or similar color in the original document but which are predicted to be different in the printed document. At S114, a proposed unifying color correction may be presented to the submitter A, e.g., on the display.

At S116, out-of-gamut spot colors are detected and at S118, a color within the current gamut of the printer is proposed to the submitter, e.g., on the display.

At S120, out-of-gamut colors or regions of images/graphics are detected and at S122, the submitter may be prompted to annotate the document with proposals for correction. Alternatively or additionally, a color within the current gamut of the printer is proposed to the submitter.

At S124, missing profiles are automatically detected and at S126, a profile or set of profiles may be presented to the user for selection.

At S128, spot colors with different definitions are identified and at S130, proposals for unifying the definitions to a common spot color definition system are presented to the submitter.

At S132, which may occur at any time after the generation of the soft proof 88, 90, the submitter may interact with the reviewing application 36 to input a decision regarding accepting/rejecting an automatically generated proposal, to annotate the document, or to identify regions of the image not already identified by the reviewing application 36 as being problematic.

At S134, which may take place progressively throughout steps S110-S132, the reviewing application 36 generates a workflow history comprising a track of the revisions made with associated timestamps and associates the workflow history with the document.

At S136, when the submitter A decides to submit the document to the print shop 18, the reviewing application 36 uploads the document, together with its workflow history, to the interface module 40.

At S138, at the print shop, an operator B receives the incoming document 16 and reviews it, together with the annotations made, at workstation 20, using the second reviewing application 38, or by accessing a common reviewing application 36 with a web browser. The operator may make further annotations/modifications to the document and return the modified document 22 to the submitter or, if the document is considered to be ready for printing, at S140 submit it to the printing infrastructure for printing. The document 26 is printed by the printer at S142. The method ends at S144.

The method illustrated in FIG. 2 may be implemented in one or more computer program products that may be executed on respective computers. The computer program product(s) may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on general purpose computer(s), special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing at least a portion of the flowchart shown in FIG. 2, can be used to implement the method for proofing a document for printing.

Print shops and designers desire a faster, more efficient process for achieving acceptable color prints. The exemplary print mediator 12 and method of use facilitate such a goal by enabling customers to see, before submission, where changes need to be made to the document, where compromises are likely and so forth. Using the system 12 gives them access to printer information for the specific document, which they currently do not have and helps them to specify, in the light of this, how they would like the document to be printed.

EXAMPLES

To illustrate the usage of the exemplary reviewing application 36, three cases are provided as examples, based on real observations of problems arising in print shops. In all these use cases, the print mediator 12 allows users, prior to print shop submission, to detect and correct problems in a document where some colors may appear as intended by the designer and some may not.

Case 1: Color Mismatch

In the first use case, colors appear to be identical on the user's screen 28/local printer, but because of different rendering models between design and remote printer, will ultimately print differently. This may arise because colors intended to be identical are defined differently within a document. This can result in the colors appearing the same when rendered on a screen but differently on a printer. In a working document (see FIG. 3) the black document background and the black logo background are specified in different ways (e.g., one is defined as a spot color and the other as a process color, or one as an image and the other as a graphics object). Both blacks appear identical in the working document visualization 80 on the monitor screen. However, once printed, the blacks will appear differently. When the document is visualized through the print mediator application prior to submission the following occurs.

Problem detection: The comparative soft proofing functionality 60 shows the problematic color change before printing the document. The problem may be detected and specified automatically through the color match detector 102.

Problem correction: To solve the problem, the submitter can specify that the logo background should be identical to the document background (see FIG. 3). This solution could also be automatically applied by the corrector 104, based on the detector analysis.

Case 2: Out-of-Gamut

In the second case, a document contains a spot color, such as a Pantone, DIC, Toyo, or ANPA color that is out of the printer's gamut and therefore cannot be printed correctly on the selected printer. Spot colors, such as Pantone colors are specified by reference to the number of a printed color swatch and are often used to ensure that company logos and so forth retain their unique color.

Figure 5:
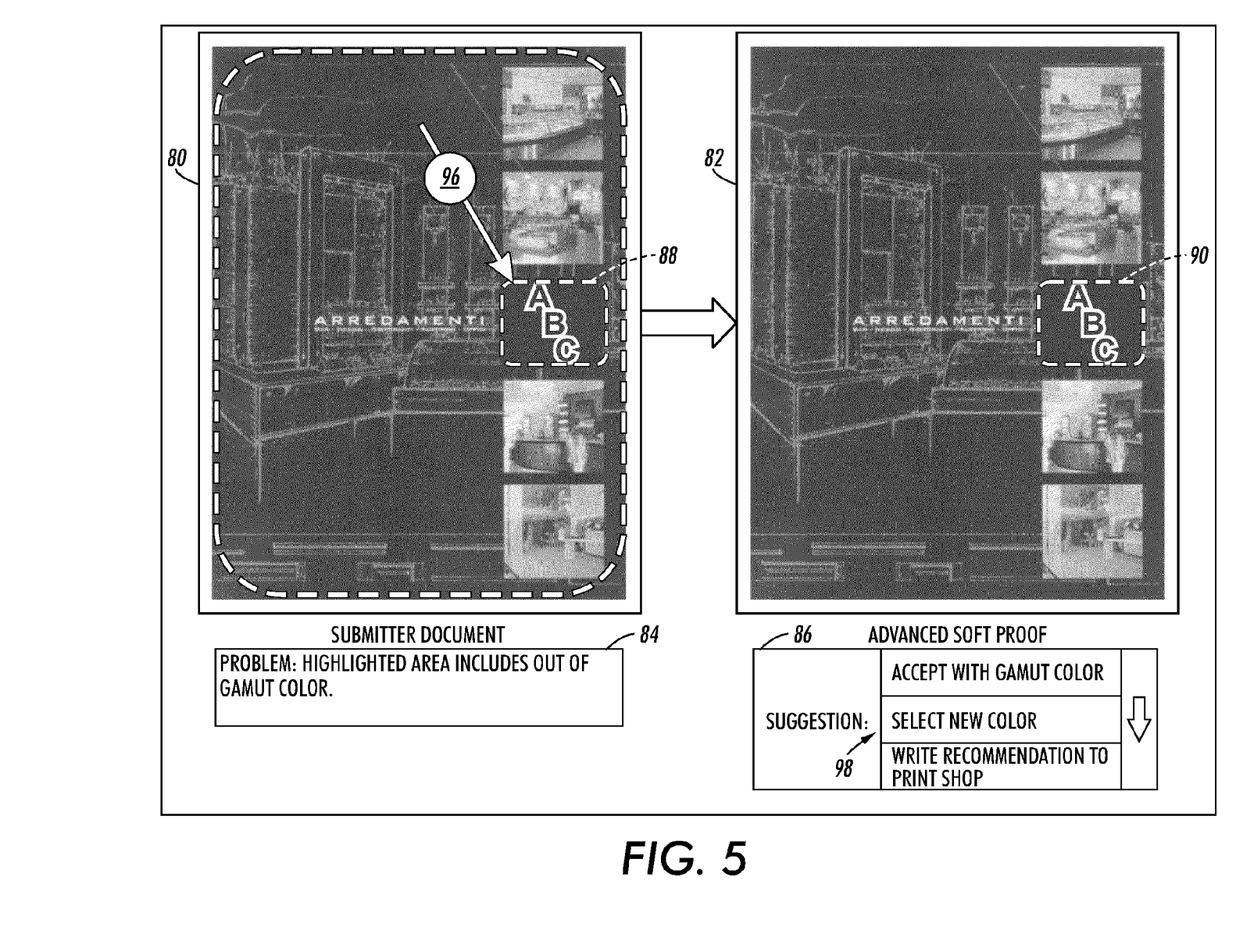
FIG. 5 illustrates a screen shot of a screen generated by the exemplary print mediator for an original document showing user annotations concerning a predicted mismatch in color between the document and a printed document derived therefrom.

In a working document shown in FIG. 5, a logo 88 is specified as a Pantone color (e.g., a bright yellow), which is out-of-gamut of the target printer 24. In this case, a substitute, in-gamut, or gamut-mapped, color would normally be printed. There are many ways in which a color can be gamut mapped, some of which will meet the document designer's intent better than others. However, the choice of gamut mapping is typically left to the printer manufacturer or the print shop, both of whom may know nothing of the document designer's intent or preference. When the document is visualized through the print mediator application 36 prior to submission, this problem will be detected and highlighted (at 90), and can thus be solved by giving the designer some choice in the gamut mapping decision.

Problem detection: The comparative soft proofing functionality of print mediator shows the problematic color change before printing the document. The problem can be detected and specified automatically through the gamut alarm detector 106 and shown to the user.

Problem correction: To solve the problem, the print mediator can propose to the submitter, the calorimetrically closest Pantone color available on the target printer. The user can accept the proposed color or select a different one.

Case 3: Profile Mismatch

In this case, the settings and profiles used to simulate Pantone colors are different between the designer's workstation 14 and the printer DFE 52. This may arise because spot colors often have different definitions on different devices or systems. For example Pantone defines spot colors calorimetrically and provides printed swatchbook samples that match these specifications. When Pantone spot colors are defined as SWOP CMYK values, the color resulting is different from the Pantone swatchbook sample. Likewise the definitions provided in the digital printer's DFE may result in yet other sets of colors. Typically, a designer will specify a color using a Pantone swatchbook but when the DFE interprets the Pantone color specification, it simulates the Pantone color with a CMYK mixture. The resulting color often does not match the appearance in the original Pantone swatchbook nor the Pantone SWOP simulation, nor another digital press.

Figure 6:
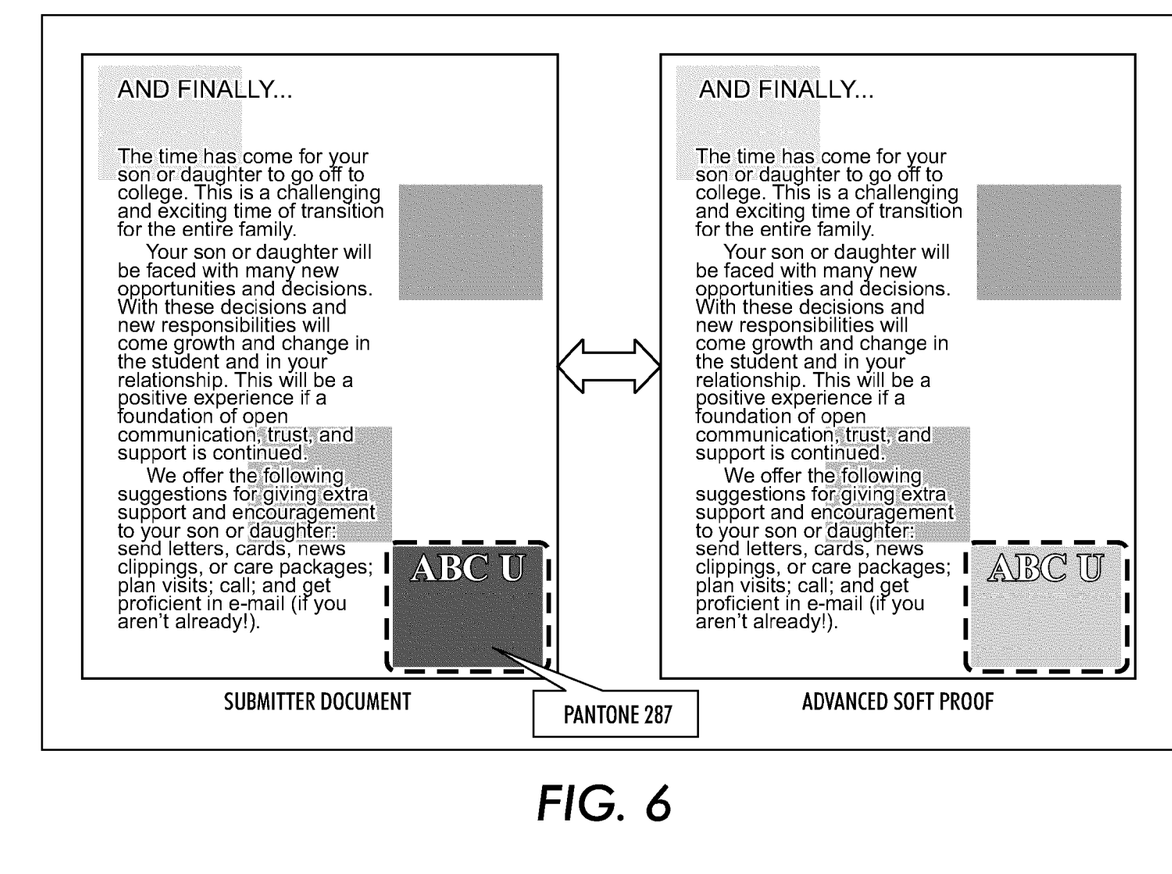
FIG. 6 illustrates a screen shot of a screen generated by the exemplary print mediator for an original document showing a predicted mismatch in spot color between the document and a printed document derived therefrom.

Problem Correction: The print mediator identifies spot colors in the document (FIG. 6) and indicates where they will print differently from the designer's intent. The system 12 then offers users the choice of printing to match the Pantone swatchbook definition, or any other appropriate definition of the color. The user makes the choice that suits their aesthetic intent.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A print mediator comprising:
an interface module which serves as an interface for a document to be submitted for printing by an associated printing infrastructure, the interface module communicating with the associated printing infrastructure for acquiring color rendering information for a print queue of the printing infrastructure which is predicted to be used for printing the document, the print queue including at least one printing device, the acquired color rendering information including information acquired from the at least one printing device;

a first reviewing application capable of communicating with the interface module for receiving the acquired color rendering information, the first reviewing application generating a visual representation of a document to be submitted for printing based on the color rendering information communicated by the interface module, the first reviewing application detecting problems relating to color rendering by the printing infrastructure and proposing corrections for the problems to a first user, the first reviewing application being configured for displaying the visual representation on a first display and for receiving, as input, the first user's annotations to the document and for receiving the first user's decision on the proposed corrections, the first user's annotations including a textual description of at least one of a problem observed by the user and a required correction; and at least one of the first reviewing application and a second reviewing application capable of communicating with the interface module for enabling a second user to review the annotated document on a second display after it has been submitted to the interface module, including reviewing the first user's annotations.

2. The print mediator of claim 1, wherein the first reviewing application is substantially identical with the second reviewing application, the interface module providing an interface between the first reviewing application and the second reviewing application.

3. The print mediator of claim 1, wherein the first reviewing application generates a workflow history which accompanies the document when it is submitted to the interface module, the workflow history including user-selected annotations and corrections.

4. The print mediator of claim 1, wherein the color rendering information includes print queue settings.

5. The print mediator of claim 1, wherein the reviewing application includes a plurality of detectors for detecting problems relating to color rendering by the printing infrastructure.

6. The print mediator of claim 5, wherein the detectors are selected from the group consisting of:
a detector which identifies a group of objects which are of similar color in the document to be submitted but which are predicted, based on the color rendering information, to be different in the document when printed;
a gamut alarm which detects colors which are predicted to be out-of-gamut for the printing infrastructure, based on the color rendering information;
a profile checker which detects whether at least a portion of the document to be submitted lacks a color profile; and
a spot color definition checker which detects a spot color which has a definition which is different from a definition in the print queue.

7. The print mediator of claim 1, wherein the interface module is hosted by a first computing device and the first reviewing application is hosted by a second computing device remote from the first computing device.

8. The print mediator of claim 7, wherein the second reviewing application is hosted by a third computing device remote from the second computing device.

9. The print mediator of claim 1, wherein the interface module comprises a web interface which is hosted by a public site of a print shop which includes the print infrastructure and the first reviewing application accesses the web application via web browser.

10. The print mediator of claim 1, wherein the print mediator comprises memory and a computer processor and wherein the first and optional second reviewing applications comprise software instructions stored in the memory which are executed by the computer processor.

11. The print mediator of claim 1, wherein the visual representation comprises a contemporaneous display of the original document to be submitted and a soft proof of the rendered document for visual comparison, the soft proof being generated using settings acquired from the print queue to being used in printing the document.

12. A distributed printing system comprising the print mediator of claim 1 and the printing infrastructure.

13. The distributed printing system of claim 12, comprising a first computing device which hosts the first reviewing application and a second computing device which hosts the second reviewing application.

14. A method for managing color rendering problems, comprising:
with a first reviewing application, receiving a document to be submitted for printing;
accessing a print queue of a printing infrastructure with an interface module to acquire color rendering information, the color rendering information including information acquired from a printer of the print queue which is predicted to be used for printing the document, the information including settings of the printer which affect the printer's ability to render colors;
communicating the acquired color rendering information between the interface module and the first reviewing application;
with the first reviewing application:
detecting problems relating to color rendering by the printing infrastructure for the document to be submitted for printing,
generating a visual representation of the document to be submitted, based on the acquired color rendering information and detected problems,
generating corrections for the problems,
outputting the visual representation to a first display;
providing for a first user to select whether to accept the corrections and to annotate the document;
submitting the optionally annotated and corrected document to the interface module; and
with at least one of the first reviewing application and a second reviewing application, generating a visual presentation of the submitted document, including providing for annotations comprising a textual description applied by the first user to be reviewed by a second user; and
outputting the visual representation to a second display for review by the second user.

15. The method of claim 14, wherein the first reviewing application is substantially identical with the second reviewing application.

16. The method of claim 14, further comprising, with the first reviewing application generating a workflow history which accompanies the document when it is submitted to the interface module, the workflow history including user-selected annotations and corrections.

17. The method of claim 14, wherein the color rendering information includes print queue settings.

18. The method of claim 14, wherein the detecting problems relating to color rendering by the printing infrastructure for the document to be submitted for printing comprises providing for:

automated detection of a group of objects which are of similar color in the document to be submitted but which are predicted, based on the color rendering information, to be different in the document when printed;

automated detection of colors which are predicted to be out-of-gamut for the printing infrastructure, based on the color rendering information;

automated detection of whether at least a portion of the document to be submitted lacks a color profile; and     automated detection of a spot color which has a definition which is different from a definition in the print queue.

19. The method of claim 14, further comprising printing the submitted document.

20. A computer program product comprising a non-transitory recording medium encoding instructions, which when executed on a computer causes the computer to perform the method of claim 14.

21. The print mediator of claim 1, wherein the first reviewing application provides for the first user to select, as the annotation, a problem category within a predefined taxonomy to enter a textual description.

22. The print mediator of claim 1, wherein the first reviewing application provides for an annotation to be further qualified or quantified by specifying a tolerance and a priority for the correction.

23. The print mediator of claim 6, wherein the detectors include:

the detector which identifies a group of objects which are of similar color in the document to be submitted but which are predicted, based on the color rendering information, to be different in the document when printed;

the gamut alarm which detects colors which are predicted to be out-of-gamut for the printing infrastructure, based on the color rendering information; and     the profile checker which detects whether at least a portion of the document to be submitted lacks a color profile.

* * * * *